US010988162B2

(12) United States Patent
Appleyard

(10) Patent No.: US 10,988,162 B2
(45) Date of Patent: Apr. 27, 2021

(54) STEERING COLUMN ASSEMBLIES

(71) Applicant: TRW Limited, Solihull (GB)

(72) Inventor: Michael Appleyard, Cheltenham (GB)

(73) Assignee: ZF Automotive UK Limited

( * ) Notice: Subject to any disclaimer, the term of this patent is extended or adjusted under 35 U.S.C. 154(b) by 88 days.

(21) Appl. No.: 16/509,143

(22) Filed: Jul. 11, 2019

(65) Prior Publication Data
US 2020/0039572 A1    Feb. 6, 2020

(30) Foreign Application Priority Data

Jul. 31, 2018 (GB) ...................... 1812441

(51) Int. Cl.
*B62D 5/00* (2006.01)
*B62D 1/10* (2006.01)
*B62D 1/16* (2006.01)

(52) U.S. Cl.
CPC ............... *B62D 5/001* (2013.01); *B62D 1/10* (2013.01); *B62D 1/16* (2013.01)

(58) Field of Classification Search
CPC .......... B62D 3/02; B62D 5/001; B62D 5/005; B62D 1/16
See application file for complete search history.

(56) References Cited

U.S. PATENT DOCUMENTS

| 7,766,777 B2* | 8/2010 | Kenez ............... B62D 5/008 475/4 |
| 10,239,552 B2* | 3/2019 | Bodtker ............ B62D 5/005 |
| 10,471,990 B2* | 11/2019 | Zuzelski ............ B62D 1/16 |
| 2018/0238377 A1* | 8/2018 | Kim ................ B62D 6/10 |

FOREIGN PATENT DOCUMENTS

| CN | 201677915 U | 12/2010 |
| KR | 1020110062630 A | 6/2011 |

* cited by examiner

*Primary Examiner* — Paul N Dickson
*Assistant Examiner* — Scott F. Underwood
(74) *Attorney, Agent, or Firm* — Robert James Harwood

(57) ABSTRACT

A steering column assembly for a vehicle includes a housing, a shaft rotatably mounted with respect to the housing and being configured for attachment of a steering wheel at one end, an engagement portion connected to and configured to rotate with the shaft, and end stop means which is mounted to the housing and is located in the path of an intermediate rotor which is mounted to the shaft and which is configured to be independently rotatable relative to the shaft, the intermediate rotor being simultaneously engageable with both the engagement portion and with the end stop upon rotation of the shaft through a predetermined angle.

14 Claims, 1 Drawing Sheet

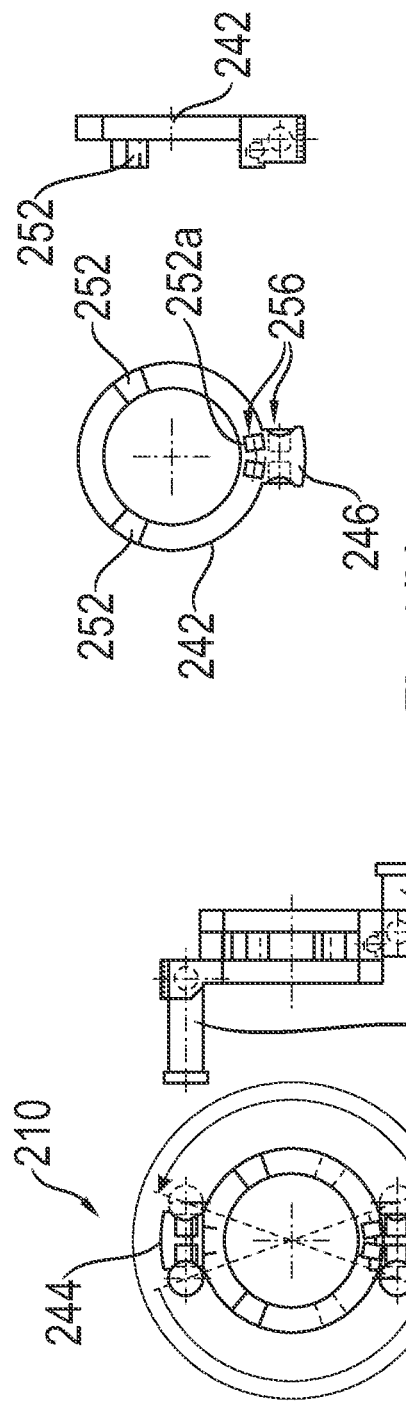
Fig. 1
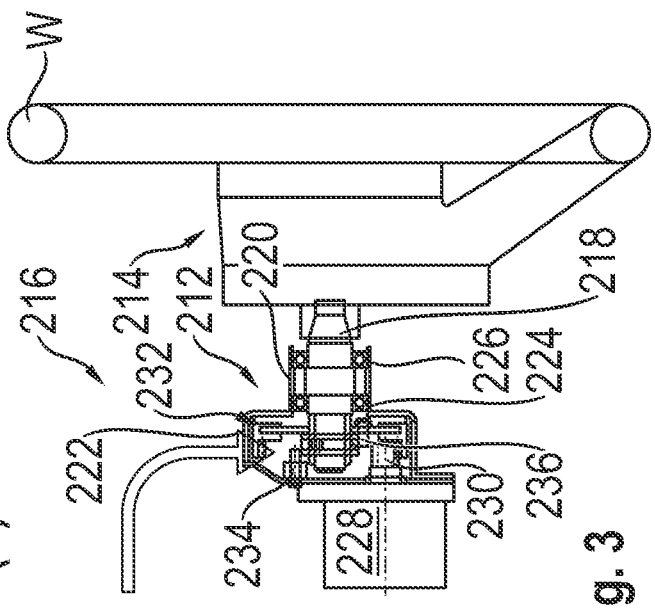
Fig. 2(b)
Fig. 3
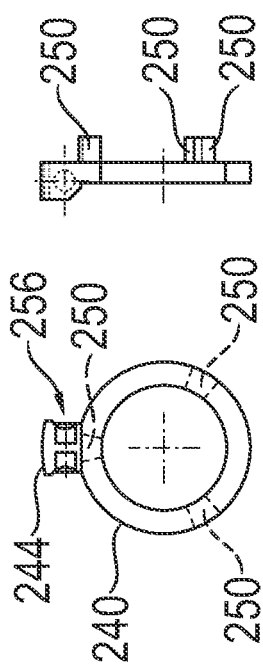
Fig. 2(a)

STEERING COLUMN ASSEMBLIES

CROSS-REFERENCE TO RELATED APPLICATIONS

This application claims priority to United Kingdom patent application 1812441.2, filed 31 Jul. 2018, the disclosure of which is incorporated herein by reference in its entirety.

TECHNICAL FIELD

The present disclosure relates to steering column assemblies and in particular, but not exclusively, to steering column assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering vehicle (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle.

One problem which occurs with such steer-by-wire arrangements arises from the fact that the vehicle wheels are not physically connected to the steering wheel, in contrast to a conventional mechanical steering arrangement. The steered wheels can only pivot through a given range of motion, and it is therefore important to limit the maximum rotational of the steering wheel so that it corresponds to the maximum extent of pivoting of the steered wheels, otherwise a driver of the vehicle would be able to rotate the steering wheel indefinitely when the steered wheels are at their maximum steering angle.

SUMMARY

In accordance with the present disclosure, a steering column assembly for a vehicle comprises a housing, a shaft rotatably mounted with respect to the housing and being configured for attachment of a steering wheel at one end, an engagement portion connected to and configured to rotate with the shaft, and end stop means which is mounted to the housing and is located in the path of an intermediate rotor which is mounted to the shaft and which is configured to be independently rotatable relative to the shaft, the intermediate rotor being simultaneously engageable with both the engagement portion and with the end stop upon rotation of the shaft through a predetermined angle.

The end stop means may be located in the path of a separate rotatable body, the said rotatable body being rotatable around the axis of the shaft and also being engageable with the said engagement portion or, where there are more than one such rotatable bodies mounted side by side, being engageable with the next adjacent rotatable body there being mechanical means on the sides of each rotatable body to limit its angle of rotation in either direction relative to that of its adjacent rotatable bodies or that of the engagement portion if this is adjacent.

Such an arrangement allows a steering wheel attached to the shaft to be rotated through more than a complete half turn in both directions before its further rotation is stopped by engagement of the engagement portion with the end stop means via engagement between the said rotatable bodies.

The engagement portion may be engageable with the end stop means via the intermediate rotor upon rotation of the shaft through predetermined angles in both directions.

The steering column assembly may further comprise a second intermediate rotor which is mounted to the shaft and which is configured to be independently rotatable relative to the shaft and which is axially positioned between the first intermediate rotor and the engagement portion and is simultaneously engageable with both the engagement portion and with first intermediate rotor upon rotation of the shaft through a predetermined angle, the first intermediate rotor not being engageable with the engagement portion in this case.

The engagement portion may be engageable with the end stop means via the intermediate rotors upon rotation of the shaft through predetermined angles in both directions.

The steering column assembly may further comprise one or more further intermediate rotors mounted to the shaft and are configured to be independently rotatable relative to the shaft and which are axially positioned side by side between the first intermediate rotor and second intermediate rotor and which are each simultaneously engageable with the intermediate rotors on either side upon rotation of the shaft through a predetermined angle.

The engagement portion may be engageable with end stop means via the intermediate rotors upon rotation of the shaft through predetermined angles in both directions.

Elastomeric material or parts may be inserted at one or more of the contact points in the engagement portion or in the end stop or in the intermediate rotors.

Resilient coatings may be used at one or more of the said contact points.

Preferably, the engagement portion is engageable with the end stop means via the said rotatable bodies upon rotation of the shaft through a predetermined angle in both directions.

In one embodiment, the engagement portion comprises a first short rod-like body which is indirectly fixed to and rotates with the shaft and which projects in a direction parallel to the axis of the shaft but is radially offset from it and which extends towards a static portion of the housing or its closing member but is still distal from same at its extremity.

The end stop comprises a second short rod-like body which is indirectly fixed to the said static portion of the housing or its closing member and projects in a direction parallel to the axis of the shaft but is radially offset from it and which extends towards at the plane perpendicular to the shaft in which the extremity of the first short rod-like body rotates. The extremity of the second short rod-like body is still distal from the said plane at its extremity.

One or more rings may be mounted on the shaft and are free to rotate independently on it but are constrained axially. If there is only one such ring present, this ring may have a projection extending radially and/or axially which eventually comes into contact with a first side of the first short rod-like body when the ring is rotated in a clockwise direction. The said projection eventually comes into contact with the second side of the first short rod-like body when the ring is rotated in an anti-clockwise direction. With embodiment, it is possible to provide a mechanical limit at substantially in excess of 180 degrees of rotation of the steering wheel in each direction from its central position, the exact amount of possible rotation depending on the respective widths of the first and second short rod-like bodies and the width of the projections extending from the ring.

In a second embodiment, the rotational travel of the steering wheel can be increased further by incorporating a second rotatable ring positioned between the first ring and the said static portion of the housing or its closing member, this second ring having a projection suitably positioned to eventually make contact with the second short rod-like body when rotated in either direction, this said projection replacing the projection on the first ring which made contact with the second short rod-like body in the first embodiment, there being also one or more substantially equi-spaced tooth-like features extending axially from each of the adjacent faces of the first and second rings such that these tooth-like features eventually engage with their counterparts in order to limit the relative rotation between the first and second rings. With this second embodiment, it is possible to provide a mechanical limit in excess of 270 degrees of rotation of the steering wheel in each direction from its central position, the exact amount of possible rotation depending on the respective widths of the first and second short rod-like bodies and the width of the projections extending from the ring.

In a third embodiment, one or more additional rings can be inserted between the said first and second rings, each additional ring or rings having one of more tooth-like features extending axially from their opposite faces such that they eventually engage with their counterparts on their respective neighbouring rings to limit the rotation relative to them. The more rings of this type that are added, then the greater can be the mechanically limited rotational travel of the steering wheel relative to the housing. With this third embodiment, it is possible to provide a mechanical limit in excess of 360 degrees of rotation of the steering wheel in each direction from its central position, the exact amount of possible rotation depending on the number of rings added and on the respective widths of the first and second short rod-like bodies and the width of the various engaging projections extending from the rings.

Each circumferential point of contact between one ring and its neighbouring ring or its adjacent short rod-like body is a potential source of noise and therefore it is advantageous to have inserts made of resilient material installed in pockets in at least one of the two surfaces at each point of contact and for the said inserts to be protruding slightly above the said surfaces. Alternatively, resilient surface coatings may be used at these locations.

BRIEF DESCRIPTION OF THE DRAWINGS

Hereinafter the present disclosure shall be illustrated in detail by way of an embodiment and with reference to the enclosed drawings, wherein:

FIG. 1 shows an end view and side view of an embodiment of steer-by-wire steering wheel turn limiting mechanism in accordance with the present disclosure;

FIG. 2(a) is an end view and a side view of a component ring of the mechanism of FIG. 1;

FIG. 2(b) is an end view and a side view of another component ring of the mechanism of FIG. 1;

FIG. 3 is a longitudinal cross-section through a portion of a steering column of a steer-by-wire steering mechanism, which the turn limiting mechanism of FIG. 1 has been fitted.

DETAILED DESCRIPTION

An embodiment of steer-by-wire steering wheel turn limiting mechanism 210 in accordance with the present disclosure is illustrated in FIGS. 1 to 3. The mechanism is installed inside a steering column 212 of a hand wheel actuator assembly 214 which is part of a steer-by-wire system 216 for a road vehicle.

A steering wheel W is attached to one end of a main shaft 218 (the right-hand end of the shaft as shown in FIG. 3) and is rotatably mounted in a tubular extension 220 of a main housing 222 by means of two longitudinally separated bearings 224, 226. The main housing 222 also encloses a motor 228 whose output is connected to the inner end of the main shaft 218 in order to provide a sensation of road feel to the driver.

The output of the motor 228 is connected to a motor pinion 230 which in turn engages with a ring gear 232 which is secured to the end of, and rotates with, the main shaft 218. A first pin 234 is fixed to the main housing 222 and a second pin 236 is secured to, and rotates with, the ring gear 232.

First and second metal rings 240, 242 are also mounted on the end of the main shaft 218 longitudinally outward of the ring gear 232. The longitudinal position of the two rings 240, 242 on the main shaft 218 is fixed, and the rings are a close fit on the main shaft 218 but are free to rotate with respect to it. Each of the two rings 240, 242 is also provided with a radially extending projection 244, 246, which are engageable with the first fixed pin 234 and the second pin 236 mounted on the ring gear 232, respectively. The length of the first fixed pin 234 is chosen so that it can only make contact with the projection 244 of the first ring 240 and the length of the second pin 236 on the ring gear 132 is chosen so that it can only make contact with the projection 246 of the second ring 242.

The first and second metal rings 240, 242 are also provided with three equally angularly spaced, identical longitudinally-extending projections 250, 252 on their adjacent faces which cause the two rings to rotate with each other when the projections are in abutment.

In order to understand the operation of the mechanism, consider a first scenario where the two rings 240, 242 are locked together as a result of the abutment of the projections 250, 252 and where the projection 244 of the ring 240 is in contact with the first fixed pin 234 secured to the housing 222 as a result of the rotation of the rings in the first direction and in which the projection 246 of the ring 242 is in contact with the second pin 236 mounted on the ring gear 232 as a result of rotation of the steering wheel W and the main shaft 218 to its maximum extent in a first direction. It is then possible to rotate the steering wheel W and the main shaft 218 in the opposite direction by an amount which falls just short of two whole rotations, until the projection 244 of the ring 240 is once again in contact with the first fixed pin 234 and the projection 246 of the ring 242 is once again in contact with the second pin 236. The two rings 240, 242 then able to rotate with respect to one another upon further rotation of the steering wheel W and the main shaft 218 until the projections 250, 256 on their adjacent faces engage each other. The width and spacing of the projections may be chosen so that the maximum angle by which the rings can rotate relative to the other is equal to the angle by which the shaft 218 is unable to complete two full turns.

Each of the projections 244, 246 and the projection 250a are provided with two rubber inserts 256 which cushion the contact for light and medium impacts. In exceptional heavy impacts, the rubber inserts may be fully compressed and metal-to-metal contact may occur.

What is claimed is:

1. A steering column assembly for a vehicle, comprising:
a housing, a shaft rotatably mounted with respect to the housing and being configured for attachment of a steering wheel at one end, an engagement portion connected to and configured to rotate with the shaft, an end stop means which is mounted to the housing, a first intermediate rotor mounted to the shaft and configured to be independently rotatable relative to the shaft, the first intermediate rotor having first and second projections extending therefrom, the end stop means being located in a path of the first projection, the first projection being engageable with the end stop means upon rotation of the shaft through a predetermined angle, and a second intermediate rotor mounted to the shaft and configured to be independently rotatable relative to the shaft, the second intermediate rotor having third and fourth projections extending therefrom, the engagement portion being located in a path of the third projection, the second intermediate rotor being simultaneously engageable with the engagement portion through the third projection and with the second projection of the first intermediate rotor through the fourth projection upon rotation of the shaft through the predetermined angle.

2. A steering column assembly as defined in claim 1, wherein the engagement portion is engageable with the end stop means via the first and second intermediate rotors upon rotation of the shaft through the predetermined angle in the clockwise direction and in the counterclockwise direction.

3. A steering column assembly as defined in claim 1, wherein the second intermediate rotor is axially positioned between the first intermediate rotor and the engagement portion.

4. A steering column assembly as defined in claim 3, further comprising one or more further intermediate rotors mounted to the shaft, the one or more further intermediate rotors being configured to be independently rotatable relative to the shaft and being axially positioned side by side between the first intermediate rotor and the second intermediate rotor, the one or more further intermediate rotors each being simultaneously engageable with the intermediate rotors on either side upon rotation of the shaft through the predetermined angle.

5. A steering column assembly as defined in claim 4, wherein the engagement portion is engageable with the end stop means via the first intermediate rotor, the second intermediate rotor and the one or more further intermediate rotors upon rotation of the shaft through the predetermined angle in the clockwise direction and in the counterclockwise direction.

6. A steering column assembly as defined in claim 1, in which elastomeric material or parts are inserted at one or more contact points on the engagement portion or on the end stop means or on the first and second intermediate rotors.

7. A steering column assembly as defined in claim 6, in which resilient coatings are used at one or more of the contact points.

8. A steering column assembly as defined in claim 1, wherein the first projection extends in a radial direction from the first intermediate rotor and the second projection extends in an axial direction from the first intermediate rotor, the third projection radially extending from the second intermediate rotor and the fourth projection axially extending from the second intermediate rotor, the radial and axial directions being perpendicular to one another.

9. A steering column assembly as defined in claim 8, wherein the first intermediate rotor has a plurality of second projections extending in the axial direction therefrom, the second projections being circumferentially spaced from one another on the first intermediate rotor, the second intermediate rotor having a plurality of fourth projections extending in the axial direction therefrom, the fourth projections being circumferentially spaced from one another on the second intermediate rotor.

10. A steering column assembly as defined in claim 1, further comprising:
a motor mounted to the housing and actuatable to rotate a pinion with respect to the housing; and
a ring gear connected to and configured to rotate with the shaft, the ring gear engaging the pinion, the engagement portion being connected to the ring gear and configured to rotate with the ring gear and the shaft relative to the housing.

11. A steering column assembly as defined in claim 10, wherein the at least one intermediate rotor comprises:
a first intermediate rotor mounted to the shaft and configured to be independently rotatable relative to the shaft, the end stop means being located in a path of the first intermediate rotor, the first intermediate rotor being engageable with the end stop means upon rotation of the shaft through a predetermined angle; and
a second intermediate rotor mounted to the shaft and configured to be independently rotatable relative to the shaft, the engagement portion being located in a path of the second intermediate rotor, the second intermediate rotor being simultaneously engageable with the engagement portion and with the first intermediate rotor upon rotation of the shaft through the predetermined angle.

12. A steering column assembly for a vehicle, comprising:
a housing;
a shaft rotatably mounted with respect to the housing and being configured for connection to a steering wheel;
a motor mounted to the housing and actuatable to rotate a pinion with respect to the housing;
a ring gear connected to and configured to rotate with the shaft, the ring gear engaging the pinion;
an engagement portion connected to the ring gear and configured to rotate with the ring gear and the shaft relative to the housing;
an end stop means mounted to the housing; and
at least one intermediate rotor mounted to the shaft and configured to be independently rotatable relative to the shaft, the end stop means being located in a path of the at least one intermediate rotor, the at least one intermediate rotor being simultaneously engageable with both the engagement portion and the end stop means upon rotation of the shaft through a predetermined angle.

13. A steering column assembly as defined in claim 12, wherein the first intermediate rotor has first and second projections extending therefrom, the end stop means being located in a path of the first projection, the first projection being engageable with the end stop means upon rotation of the shaft through the predetermined angle, the second intermediate rotor having third and fourth projections extending therefrom, the engagement portion being located in a path of the third projection, the second intermediate rotor being simultaneously engageable with the engagement portion through the third projection and with the second projection of the first intermediate rotor through the fourth projection upon rotation of the shaft through the predetermined angle.

14. A steering column assembly as defined in claim 13, wherein the first intermediate rotor has a plurality of second projections extending in the axial direction therefrom, the second projections being circumferentially spaced from one another on the first intermediate rotor, the second intermediate rotor having a plurality of fourth projections extending in the axial direction therefrom, the fourth projections being circumferentially spaced from one another on the second intermediate rotor.

\* \* \* \* \*